No. 725,985. PATENTED APR. 21, 1903.
F. C. NEWELL.
ELECTROMAGNETIC BRAKE.
APPLICATION FILED DEC. 16, 1899.
NO MODEL. 5 SHEETS—SHEET 2.
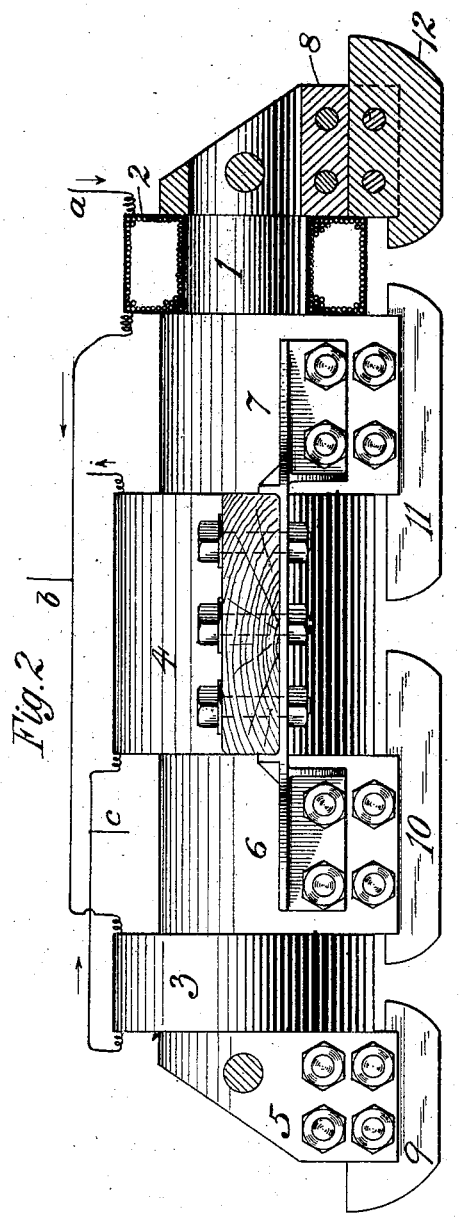
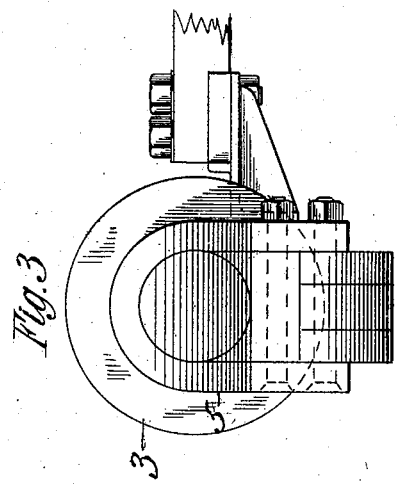
WITNESSES:
J. S. Custer
INVENTOR,
Frank C. Newell,
by T. J. Hogan,
Att'y.

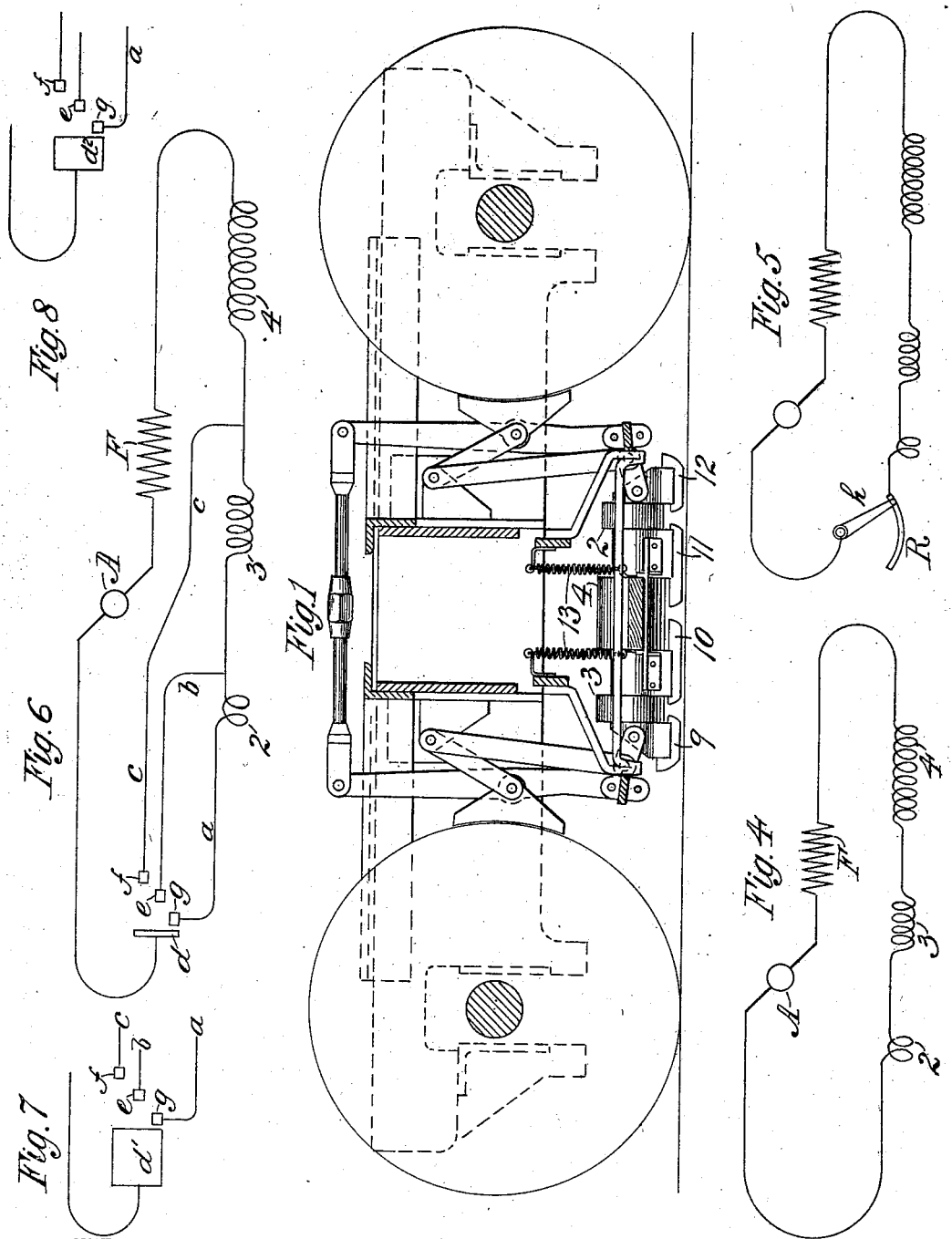

No. 725,985. PATENTED APR. 21, 1903.
F. C. NEWELL.
ELECTROMAGNETIC BRAKE.
APPLICATION FILED DEC. 16, 1899.
NO MODEL. 5 SHEETS—SHEET 3.
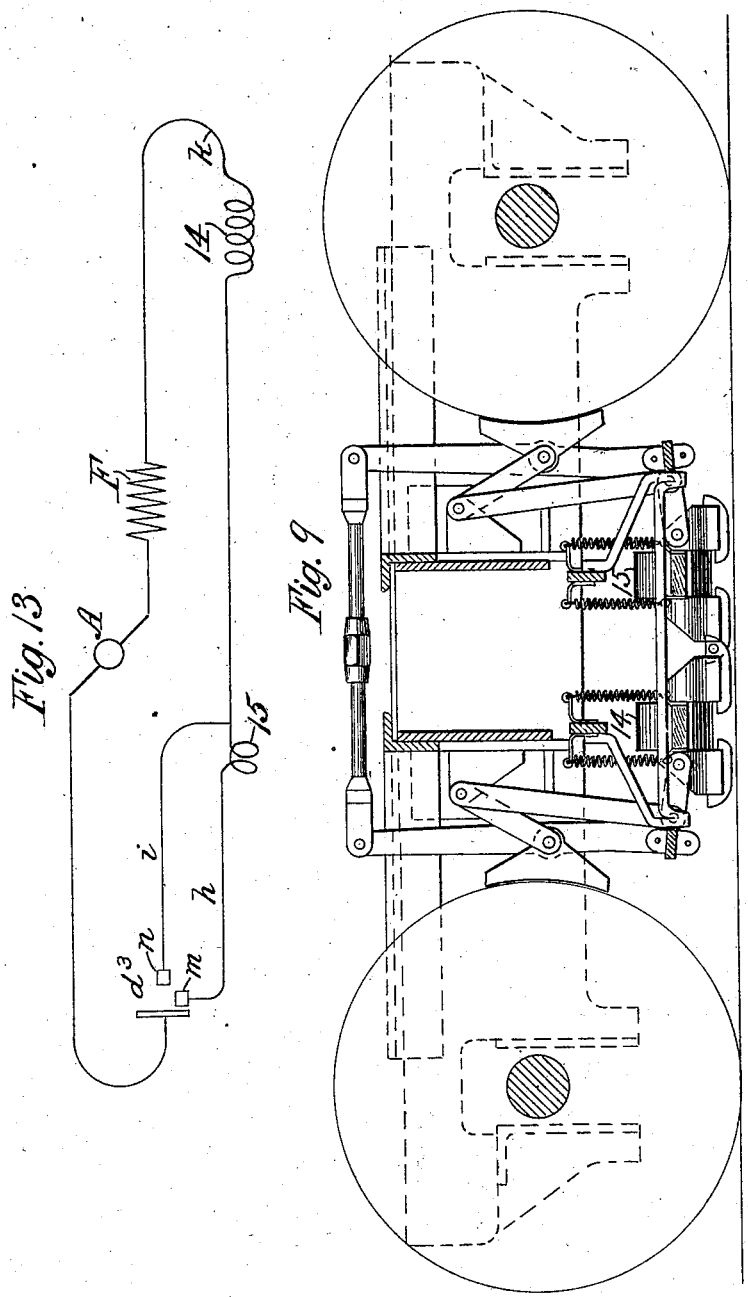

No. 725,985. PATENTED APR. 21, 1903.
F. C. NEWELL.
ELECTROMAGNETIC BRAKE.
APPLICATION FILED DEC. 16, 1899.
NO MODEL. 5 SHEETS—SHEET 4.
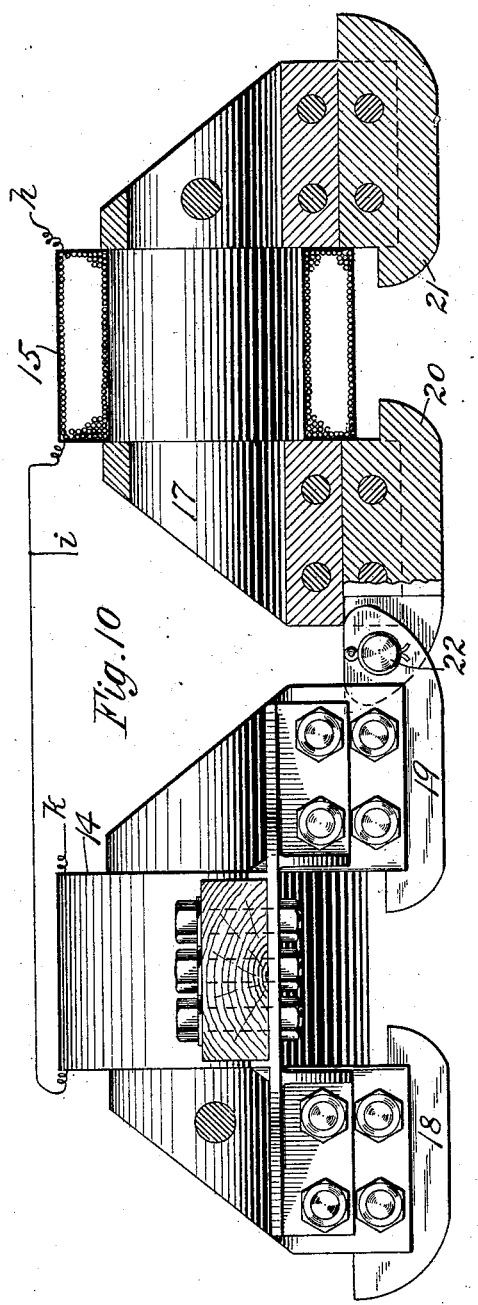
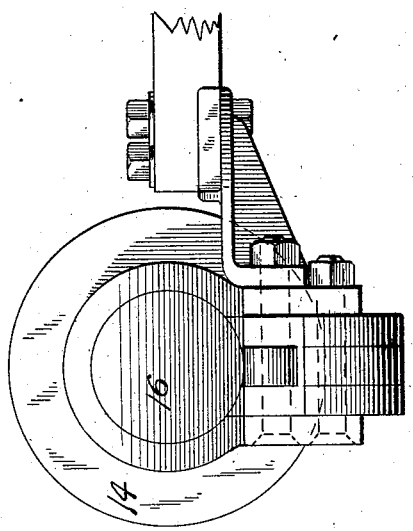
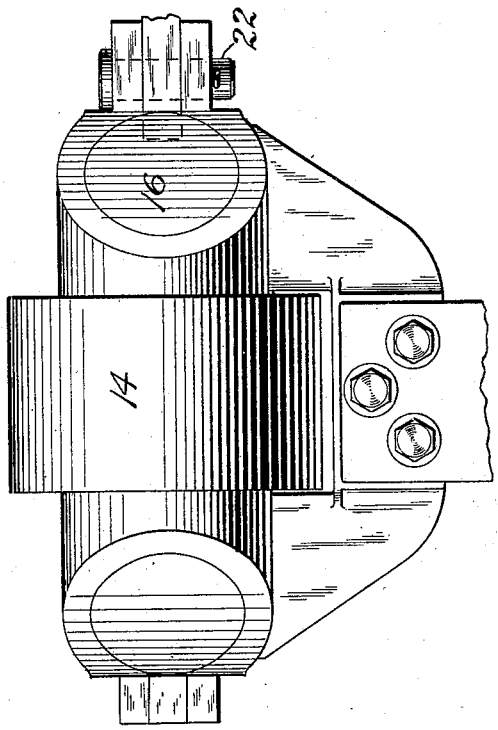
WITNESSES:
INVENTOR,
Frank C. Newell,
by T. J. Hogan, Att'y.

No. 725,985. PATENTED APR. 21, 1903.
F. C. NEWELL.
ELECTROMAGNETIC BRAKE.
APPLICATION FILED DEC. 16, 1899.
NO MODEL. 5 SHEETS—SHEET 5.
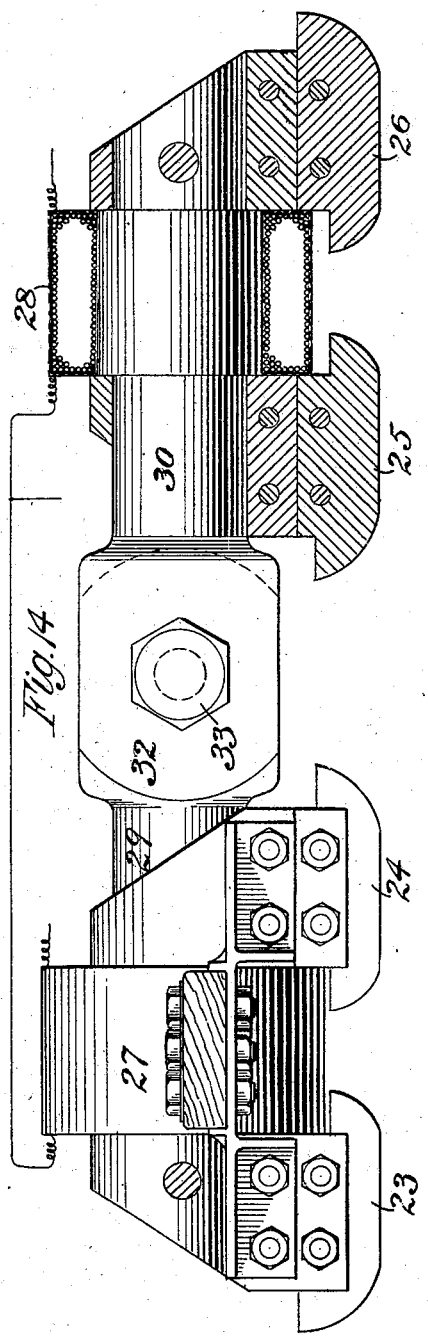
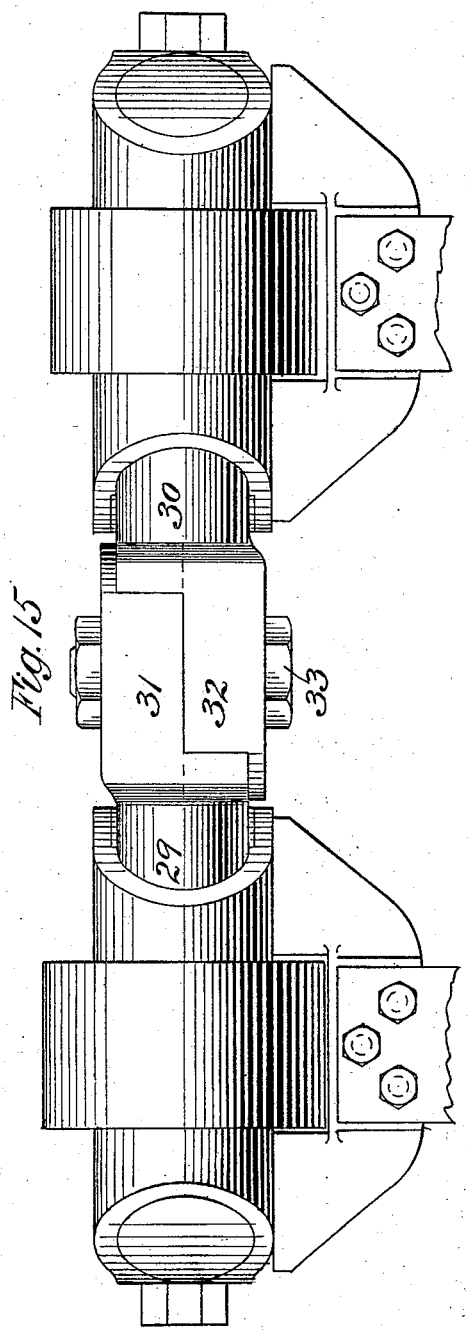
WITNESSES:
INVENTOR,
Frank C. Newell,
by T. J. Hogan,
Att'y.

UNITED STATES PATENT OFFICE.

FRANK C. NEWELL, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

ELECTROMAGNETIC BRAKE.

SPECIFICATION forming part of Letters Patent No. 725,985, dated April 21, 1903.

Application filed December 16, 1899. Serial No. 740,557. (No model.)

*To all whom it may concern:*

Be it known that I, FRANK C. NEWELL, a citizen of the United States, residing at Wilkinsburg, county of Allegheny, State of Pennsylvania, have invented or discovered a certain new and useful Improvement in Electromagnetic Brakes, of which improvement the following is a specification.

The object of my invention is to provide an improvement in electromagnetic brakes; and to this end my invention consists in a new and improved electromagnetic brake apparatus comprising means whereby the braking force may be varied and regulated automatically or at will in accordance with the speed of the car or rotation of the wheels or as may otherwise be found desirable.

In the accompanying drawings, which illustrate my invention, Figure 1 is a view, partly in elevation and partly in section, showing my invention applied to a car; Fig. 2, a side elevation of a multipolar brake-shoe device constructed in accordance with my invention; Fig. 3, an end view of the construction shown in Fig. 2; Fig. 4, a diagrammatic view showing the brake-magnet coils and the armature and field coils of the motor when connected in a local circuit for automatic regulation; Figs. 5, 6, 7, and 8, similar views showing means for regulating and for manually varying the adjustment for regulating; Fig. 9, a view, partly in elevation and partly in section, showing a modification of my improved magnetic brake device applied to a car; Fig. 10, a view, partly in elevation and partly in section, showing the flexible magnetic brake device of Fig. 9 on a larger scale; Fig. 11, a plan view of a portion of the construction shown in Fig. 10; Fig. 12, an end view of the same; Fig. 13, a diagram showing the brake-circuit connections when the magnetic brake device of Figs. 9 and 10 is employed; Fig. 14, a view, partly in elevation and partly in section, showing another modification of the magnetic brake device; and Fig. 15, a plan view of the construction shown in Fig. 14.

My invention comprises a multipolar electromagnetic brake device with a plurality of energizing-coils by which the braking force may be varied and which is specially adapted to be connected in a local circuit with one or more motors on a car which when the brakes are applied act as generators to supply current to the local circuit; but its employment is not limited to such connection, as it may be employed where the current is obtained from the main or trolley line or from a battery.

My improved electromagnetic brake device is specially advantageous as a track-brake or in any application in which the limited capacity of the armature would, with other constructions, limit the maximum braking force. For example, in a brake system in which a bipolar magnet is applied to a rail which acts as an armature the force with which the shoes of the magnet may be held to the rail is limited by the cross-section of the rail, which cannot be increased merely for braking purposes, and it is a special object of my invention to provide means whereby in such case the braking force may be increased to any desired degree and varied either automatically or at will.

In the embodiment of my invention shown in Figs. 1 and 2 of the drawings the electromagnetic brake device consists of a multipolar magnetic device with multiple windings having a core 1, on which are wound in this instance the three coils of wire 2, 3, and 4 and which is provided with polar extensions 5, 6, 7, and 8, to which are attached the brake-shoes 9, 10, 11, and 12, arranged with their rubbing-surfaces in the same plane, so as to permit of their operation as a track-brake. The coils of wire 2, 3, and 4 are connected with one another in series, as shown in Fig. 2 of the drawings, and when the brakes are applied they are connected in a local circuit with the motor, as shown in Fig. 4, the field-coil of the motor being represented by the coil F and the armature by the circle A, so that the motor acting as a generator may then deliver current to the brake-magnet coils.

The magnetic brake device is suspended from the frame of the car by means of springs 13, as shown in Fig. 1 of the drawings, and when a current is passed through the coils the shoes are attracted to the rails and the friction between the shoes and the rails resists the movement of the car and causes the magnetic brake device to be moved backward relative to the car with a dragging action, so as to cause the application of the wheel-brakes.

An important feature of my invention consists in the means by which the braking force may be varied either independently of or in accordance with the speed of the car. For this purpose the brake-magnet device may be formed with any desired number of poles and with a corresponding number of coils of wire so wound and connected that the magnetic force may be varied by varying the effect of one or more coils. As shown in Fig. 2 of the drawings, the brake-magnet device is provided with four poles, and between the polar extensions are three coils of wire which are so connected that when the local circuit is closed, as shown in Fig. 4, the coils are connected in series with the motor, so that the current passes through each of the coils in succession. With this arrangement in order to obtain an automatic regulation of the braking force in accordance with the speed of the car the three coils are wound with a different number of turns of wire, the largest coil 4 having a sufficient number of turns to produce magnetic saturation at a comparatively low speed and with a comparatively small current, the next smaller coil 3 requiring a greater current for saturation and the coil 2 requiring a still greater current. When the car is moving at a high rate of speed and the motor is generating a corresponding current, each of the coils will receive sufficient current to produce magnetic saturation of its core, and the attraction between the shoes and the rail will then be a maximum; but as the speed of the car reduces the current generated by the motor acting as a generator will be correspondingly reduced and also the magnetizing power of the coils. As the speed of the car and the strength of the current continue to decrease the energizing effect of the coils will be successively diminished, so that at one speed the current in the coil with the least number of turns will be insufficient to energize its core so as to produce any considerable effect, and as the speed and the current are further reduced the current in the coil with the next number of turns will become practically ineffective, and so on until the car stops and no current is being generated.

In the construction shown in Fig. 2 when the local circuit is closed the current passes through the coils in such a direction that when the car is moving at a high speed and all of the coils are effective the shoes 9, 10, 11, and 12 are alternate north and south poles. When the speed is reduced to a certain degree, the current through the coil 2 will become inoperative for maintaining this condition, and the attraction between the rail and the shoes, and consequently the braking force, will be automatically reduced. On a greater reduction in speed and in the current generated by the motor the current through the coil 3 will become similarly inoperative, and the attraction between the shoes and the rail, and consequently the braking force, will be still further reduced, and the braking force will then be that due to the current in the coil 4.

My improvement is not limited to the employment of three coils, as the same principle applies where only two coils are employed, as shown in Figs. 10 and 14, or any greater number, so long as the coils may be separately varied in effectiveness or so long as the effectiveness of the coils may be separately varied automatically or at will by variations in the strength of the current.

In Fig. 6 of the drawings a diagram of the local or brake circuit is shown, with the addition of branches and contacts, by means of which the coils 2 and 3 may be successively cut out by the movement of the contact-bar $d$ by hand. When the bar $d$ is moved to make contact with the terminal $g$, the brake-circuit is the same as that shown in Fig. 4, and so long as the connections are not varied the operation will be the same as already described; but when the contact $d$ is moved by hand, so as to break connection with $g$ and to make contact with the terminal $e$, the coil 2 will be cut out and the current will flow only through the coils 3 and 4. A further movement of the bar $d$ to the right will break contact with the terminal $e$ and make contact with the terminal $f$, thereby cutting out the coil 3, so that the current will then flow through the coil 4 only. By this means the magnetic attraction between the shoes and the rails, and therefore the braking force, may be varied at will by the motorman independently of the quantity of current, and for this purpose it is not essential that the number of turns in the separate windings should be different.

In Fig. 7 of the drawings I have shown a partial view of the circuit connections shown in Fig. 6 for operation by hand, with a modification in the form of the movable contact, whereby when this contact-bar $d'$ is moved to the right the current may be successively shunted around the coils 2 and 3, the bar $d'$ being so formed as to maintain contact with the three terminals $g$, $e$, and $f$ when moved to its extreme position to the right. With this arrangement the current through the coils 2 and 3 is diminished, but not altogether cut off. The current through the coil 2 is first decreased by permitting a part of it to be shunted through the branch $b$, and by the further movement of the bar $d'$ it is further decreased by connecting the branch $c$ with the bar $d'$, which also has the effect of shunting a part of the current around the coil 3 and reducing the current through the coil 3. It will be seen that with the construction shown in Fig. 7 the effect of the manual operation of the contact $d'$ is similar to the effect produced by the varying speed of the car when the circuit remains connected, as shown in Fig. 4, the current through the coils 2 and 3 being successively reduced without being cut off.

In the modification shown in Fig. 8 the contact-bar $d^2$ is so formed and the terminals $g$, $e$, and $f$ are so arranged that when the contact-bar $d^2$ is moved to the right it first engages the terminal $g$ and closes the circuit through all of the coils 2, 3, and 4. On a further movement to the right it engages with the terminal $e$ while still in contact with the terminal $g$, so that a part of the current is shunted around the coil 2; but the current is not altogether cut off from the coil 2. By a still further movement to the right the contact-bar $d^2$ will be engaged with the terminal $f$ and disengaged from the terminal $g$, so that the coil 2 will be cut out and a part of the current shunted around the coil 3.

In both Figs. 7 and 8, as well as in Fig. 6, it will be seen that an extreme movement of the contact may be made by which the terminals $e$ and $g$ may be disengaged and both the coils 2 and 3 cut out while the contact remains in engagement with the terminal $f$ and all of the current flows through the coil 4.

In Fig. 5 of the drawings the circuit is shown connected as in Fig. 4, with the addition of a variable resistance R, by which the strength of the current may be varied by movement of the arm $h$ without breaking the circuit or shunting or cutting out any of the coils. With a constant-current supply, whether due to the speed of the car or whether derived from any source capable of furnishing a constant current, the variation of the magnetic and braking effect due to the difference in the winding of the coils may be obtained by moving the arm $h$, so as to vary the resistance, and thereby vary the current, so that the effectiveness of first one coil and then another may be varied.

My improved magnetic brake device is shown in the drawings with the brake-shoes arranged so as to make contact with the surface of a rail, and for this purpose they are arranged with their rubbing-surfaces in the same plane; but for application to other surfaces the shoes and, if necessary, the whole device, may be given the required curvature.

While I have shown an electromagnetic brake device with three coils of wire each having a different number of turns from any of the others, it will be understood that the number of poles and correspondingly the number of shoes on the polar extensions may be increased to any desired extent, and this increase in the number of poles will involve a corresponding increase in the number of interpolar spaces in which coils of wire are located for the purpose of energizing the core and producing the desired polarity in the polar extensions and in the shoes. It is not, however, essential that in a magnetic brake device with a greater number of poles and coils that the number of turns in each coil should be different from the number of turns in each and every other coil.

My invention differs from all others, so far as I am aware, in not merely varying the magnetic and braking force of a bipolar magnetic device by variations in the current supplied thereto, but in successively varying the magnetic condition and effect of the different poles and brake-shoes of a magnetic brake device provided with three or more poles, so as to reduce or modify the effect of different brake-shoes and, in effect, to reduce the magnetic brake device from a compound device, such as may be necessary for the required maximum braking effect where the armature or rail is limited in capacity, to a simple magnet the magnetic capacity of which is in accordance with the capacity of the armature or that portion of the rail between its poles, and, so far as I am aware, my invention also differs from all others in providing an electromagnetic brake device with differential coils, whereby the braking force may be varied at will or automatically in accordance with intentional or automatic variations in the current supplied to the braking-circuit and also in providing an electromagnetic brake device the variations in the effectiveness of which in accordance with variation in the current may be due to the differential relation of the coils to one another.

When the magnetic track-brake device is provided with three or more shoes rigidly connected in line with one another and the length of the device as a whole is therefore considerable, any irregularities, such as depressions or ridges in the track-rail, may cause one or more of the shoes to wholly or partly break contact with the rail, and thereby cause a very inefficient and irregular action of the brake. In order to obviate this difficulty, I provide a flexible magnetic brake device the relatively movable parts of which are so arranged and connected as to permit the brake-shoes to conform to any ordinary curvature, depression, or similar irregularity in the level of the track-rail, and in Figs. 9, 10, 14, and 15 of the drawings I have shown modifications of my improved magnetic track-brake device embodying this feature.

As shown in Figs. 9, 10, 11, and 12, the coils 14 and 15 are located on the separate cores 16 and 17 and are preferably connected, as shown in Figs. 10 and 13, so that the contact-bar $d^3$ may close the circuit through both of the coils 15 and 14 when in contact with the terminal $m$, or the circuit may be closed through one coil only, when the contact-bar $d^3$ engages with the terminal $n$. The polar extensions are provided with shoes 18, 19, 20, and 21, and the shoes 19 and 20 are loosely connected by means of a pin or bolt 22, so that the two main parts of the structure are relatively movable, so as to separately conform to irregularities in the track, and together they constitute a flexible magnetic brake device, which is adapted to utilize different portions of the rail for the passage of lines of force and by which the braking force may be regulated and varied in accordance with the current in the coils.

In Figs. 14 and 15 of the drawings I have shown a flexible magnetic brake device having four shoes 23, 24, 25, and 26 and two coils 27 and 28, which are adapted to be connected as described in referring to Figs. 10 and 13. In the construction shown in Figs. 14 and 15 the cores 29 and 30 are formed with overlapping parts 31 and 32, which are held together by means of a bolt 33, so as to form a flexible connection.

I claim as my invention and desire to secure by Letters Patent—

1. In an electromagnetic brake apparatus, a brake-magnet provided with a plurality of coils and connections, whereby the magnetic force and the braking force of one or more poles may be varied respectively by varying the effectiveness of one or more coils.

2. In an electromagnetic brake apparatus, a brake-magnet provided with a plurality of coils and connections, whereby the magnetic force and the braking force of one or more poles may be varied respectively by varying the effectiveness of one or more coils in accordance with variations in the strength of the current flowing through the coils.

3. In an electromagnetic brake apparatus, a brake-magnet provided with a plurality of shoes and a plurality of differential coils, and connections whereby the relative braking effect of the different shoes may be varied by variations in the energizing effect of the different coils.

4. An electromagnetic brake device provided with a number of poles having brake-shoes secured thereto, a plurality of coils of wire each located between different poles, and connections whereby the energizing effect of the coils may be varied so as to successively vary the relative braking effect of the shoes.

5. An electromagnetic brake device provided with three or more poles, a plurality of coils of wire each located between different pairs of poles and connections whereby the coils are adapted to produce relatively different magnetizing effects on the poles.

6. An electromagnetic brake device provided with three or more poles, a plurality of coils having different numbers of turns electrically connected in series and each located between different pairs of poles and adapted, in accordance with the number of turns of each, to produce different magnetizing effects.

7. An electromagnetic brake device comprising a continuous electromagnet having three or more poles, brake-shoes secured to the poles, two or more coils of wire consisting of a different number of turns each and located in different interpolar spaces, whereby the magnetizing and braking effects may be varied.

8. In an electromagnetic brake apparatus, the combination, with a motor on a car adapted to be connected in a local circuit and to operate as a generator, of a brake-magnet having three or more poles and brake-shoes secured to the poles, two or more coils of wire, having a different number of turns, located in different interpolar spaces on the magnet, and connected in series in the local circuit, whereby variations in the current in accordance with the speed of the car may successively vary the magnetizing effectiveness of the coils.

9. In an electromagnetic brake apparatus, a compound brake-magnet having a number of coils of different capacities connected in series with a local circuit on a car, and three or more polar extensions having shoes secured thereto and arranged in line so as to be adapted for application to a rail of a car-track.

10. A magnetic track-brake device having shoes adapted to bear on a track-rail in position to utilize two or more different portions of the rail for the passage of lines of force and a flexible connection between the shoes.

11. A magnetic track-brake device having shoes secured to different poles and adapted to bear on different parts of a track-rail, in position for, and for the purpose of, utilizing different portions of the rail for the passage of lines of force, and a flexible connection between the shoes, whereby the shoes may be relatively movable to conform to irregularities in the rail.

12. In an electromagnetic brake apparatus, a magnetic track-brake device having a plurality of coils located between different poles, and a flexible connection between the parts on which the coils are located, adjacent coils being wound in opposite directions.

13. In an electromagnetic brake apparatus, a magnetic track-brake device having a plurality of coils adapted to be connected in a local circuit on a car, a number of shoes arranged in line and adapted to make contact with a track-rail so as to utilize different parts of the rail for the passage of lines of force and means whereby the magnetic brake device is rendered flexible so as to permit relative movement of the shoes for the purpose of maintaining a proper contact between the shoes and the rail when the brakes are applied.

14. In an electromagnetic brake apparatus, a brake-magnet provided with a plurality of coils, and connections for varying the relative energizing effect of different coils, whereby the braking force may be regulated.

15. In an electromagnetic brake apparatus, a brake-magnet provided with a number of poles, a plurality of coils, each located between different poles, and means for varying the relative effectiveness of different coils, whereby the braking force may be regulated.

16. In an electromagnetic brake apparatus, a brake-magnet provided with three or more poles, a plurality of coils, adjacent coils being wound in opposite directions and located between different poles, and a flexible connection between the parts on which the coils are located.

In testimony whereof I have hereunto set my hand.

FRANK C. NEWELL.

Witnesses:
R. F. EMERY,
JAS. B. MACDONALD.